Feb. 1, 1966  R. A. BENNETT  3,232,498
DEVICE DISPENSING SOLID MATERIALS IN MEASURED QUANTITIES
Filed May 5, 1964  2 Sheets-Sheet 1

INVENTOR.
ROBERT A. BENNETT
BY Darby & Darby
ATTORNEYS

Feb. 1, 1966   R. A. BENNETT   3,232,498
DEVICE DISPENSING SOLID MATERIALS IN MEASURED QUANTITIES
Filed May 5, 1964                               2 Sheets-Sheet 2
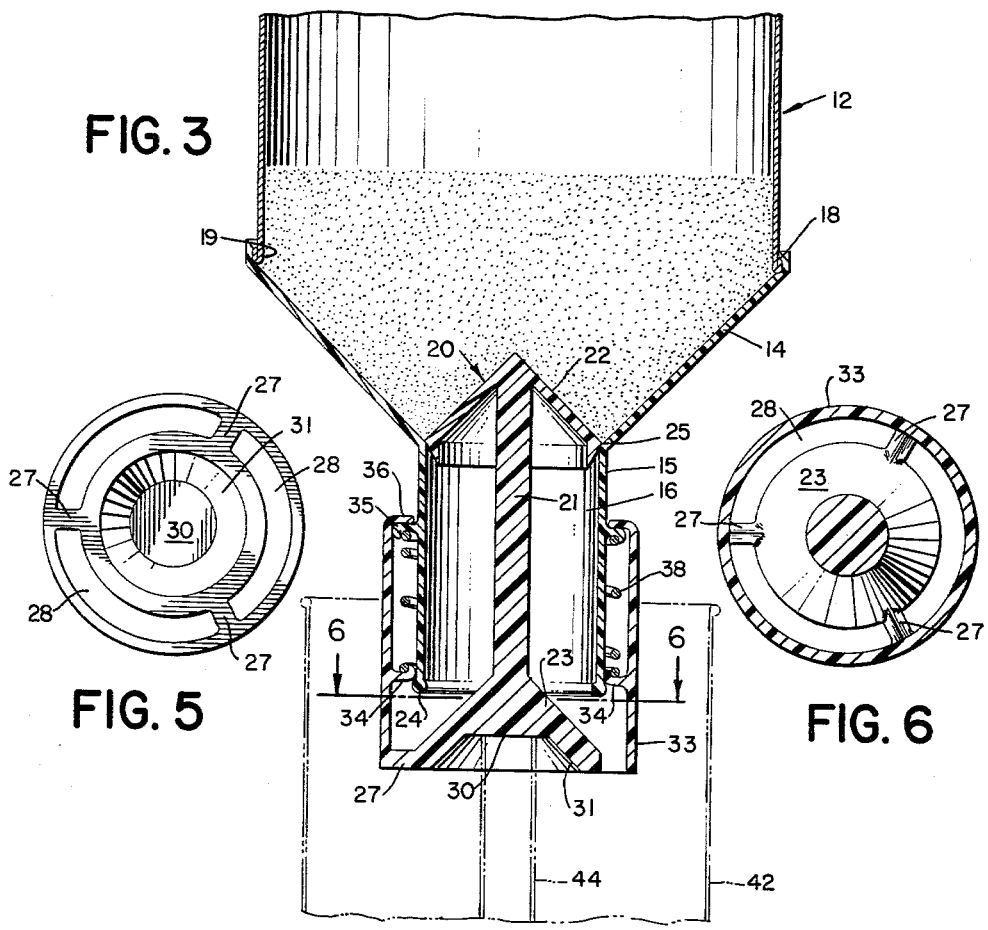
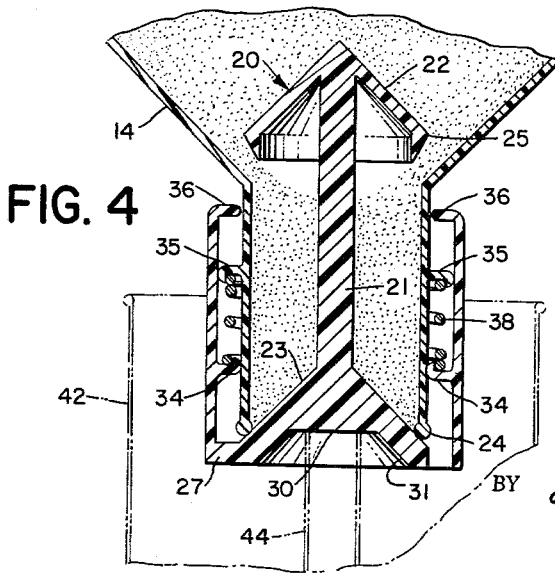
INVENTOR.
ROBERT A. BENNETT
BY Darby & Darby
ATTORNEYS United States Patent Office
3,232,498
Patented Feb. 1, 1966

3,232,498
DEVICE DISPENSING SOLID MATERIALS IN MEASURED QUANTITIES
Robert A. Bennett, 17 Du Pont Place, Bridgeport, Conn.
Filed May 5, 1964, Ser. No. 365,049
11 Claims. (Cl. 222—449)

This invention relates to dispensing devices and more particularly to a dispenser for automatically metering pre-measured quantities of material from a container to which the dispenser is attached.

Many situations arise in which it is desired to dispense material, for example in granulated or ground form, in pre-measured quantities from a container in which the material is held. One example would be in removing coffee, tea, sugar, etc., from a can in exact teaspoon or tablespoon quantities or multiples thereof.

The present invention is directed to a dispenser of relatively simple and inexpensive construction for accomplishing the aforesaid purpose. In accordance with the invention a dispenser is provided which is to be attached to a container holding the material to be metered out in the pre-measured quantities. The dispenser is formed by a member having a funnel shape at one end to fit over the open portion of the container and a dispensing chamber at the other end. The dispensing or measuring chamber is of the proper size to hold the desired volume of the material to be dispensed. Dispensing of the material is controlled by a valve member which is movable from a first normal position, in which the inlet from the funnel to the chamber is closed and the outlet of the chamber is open, to a second position in which the inlet is open and the outlet is closed. When the valve is in the second position, the material in the container is permitted to flow into the chamber but not out of it. Upon return of the valve to the normal first position, the chamber outlet is opened and the material previously trapped in the chamber is free to flow out of the dispenser.

In a preferred embodiment of the invention the valve is normally biased to the first position described above by a resilient means such as a spring. Also, the inner surface of the funnel and the portions of the valve used to open and close the inlet and outlet to the measuring chamber have sloping surfaces. This facilitates the flow of the material to be dispensed into and out of the chamber and discourages sticking of the material to the various sloping surfaces. Where the dispenser is to be used to meter coffee directly from a can into a percolator, or other similar device, having an elongated stem, the member used to move the valve preferably is provided with an indentation of a suitable shape to accommodate the elongated stem in the percolator. This provides an easy way of moving the valve.

It is therefore an object of the present invention to provide a dispenser for metering pre-measured quantities of material from a container.

A further object is to provide a dispenser having a measuring chamber whose ends are alternately opened and closed to alternately permit flow of the material to be dispensed into and out of the chamber.

Another object is to provide a dispenser of relatively simple and inexpensive construction which is adapted to be fastened to the open top of a container holding the material to be dispensed, for metering pre-measured quantities of the material from the container by an alternate opening and closing action of both ends of the dispenser's measuring chamber.

Other objects and advantages of the present invention will become more apparent upon reference to the following specification and annexed drawings in which:

FIGURES 3 and 4 are elevational views in section that show the dispenser attached to the container in different conditions of operation;

FIGURE 5 is a bottom plan view of the top or outlet of the dispenser; and

FIGURE 6 is a cross-sectional view of the upper portion of the dispenser taken along lines 6—6 of FIGURE 3 and looking toward the top of the dispenser.

Figure 1:
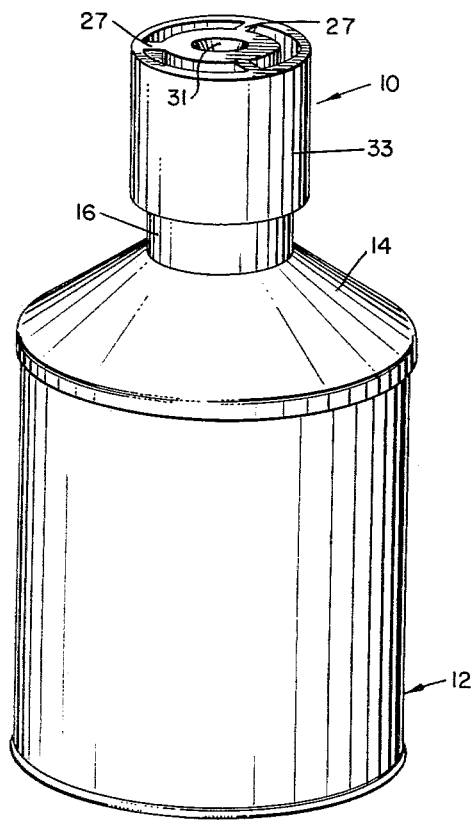
FIGURE 1 is a perspective view of the dispenser shown attached to a container.

Referring now to the drawings, FIGURE 1 shows a complete assembled dispenser 10 attached to the open top of a container 12 from which material is to be metered out in measured quantities. The container 12 may be, for example, a coffee can from which ground coffee is to be doled out in a fixed quantity such as a tablespoon at a time. Of course, the container may house any material.

Figure 2:
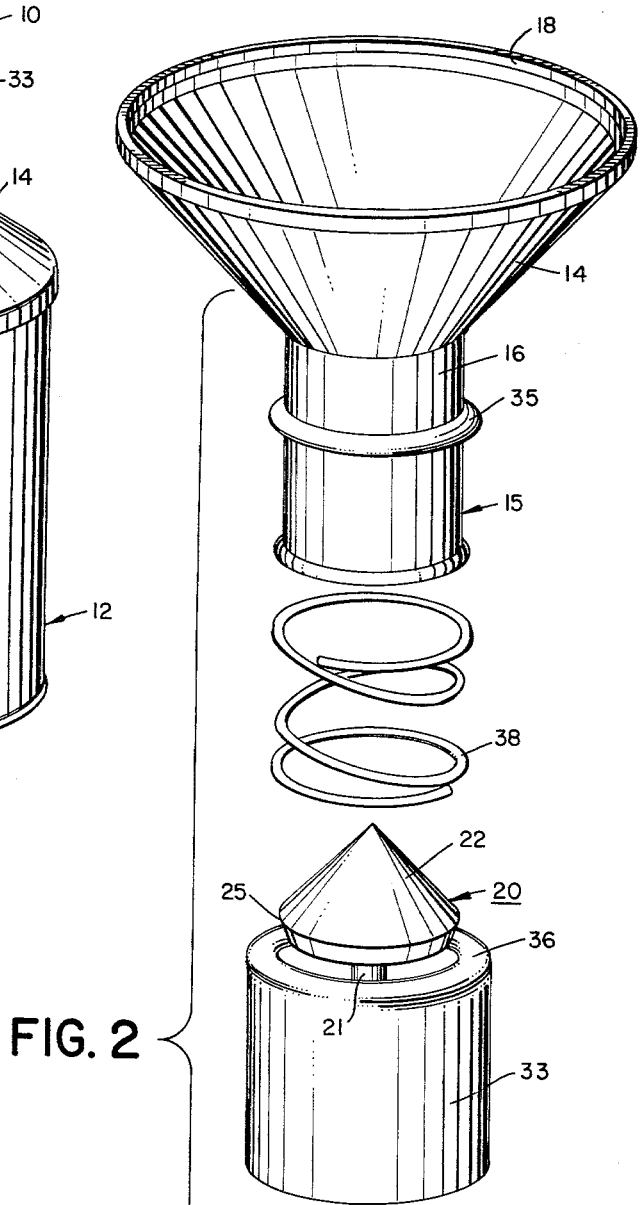
FIGURE 2 is an exploded perspective view of the dispenser itself.

As shown more clearly in FIGURES 2-4, the dispenser 10 has a generally cylindrical funnel-shaped lower piece 14 whose end is of the same general shape as the container top. Of course, any suitable shape may be used for the end of the funnel to accommodate the top of the container. A generally cylindrical chamber member 15 defining a hollow measuring chamber 16 is connected to the narrow or exit end of the funnel. The funnel-shaped member 14 also has a channel-shaped lip 18 which is adapted to fit over the rim 19 of the container 12 so that the open portion of the container will be completely sealed by the dispenser.

Disposed within the measuring chamber 16 is a movable valve 20 formed by a shaft 21 which has upper and lower valve members 22 and 23. Member 22 is located at the inlet to chamber 16 while member 23 is located at the outlet. Both valve members 22 and 23 have sloping surfaces which are preferably of conical shape. The sloping surface of member 22 extends into the interior volume of the funnel 14 while the sloping surface of member 23 is adapted to extend into the chamber 16 and make contact with the lower edge 24 of the chamber member 15 when the valve is moved to the position shown in FIGURE 4. Valve member 22 is provided to open and close the inlet to chamber 16 from the container while member 23 is provided to open and close the chamber outlet. To do this the diameter of the base 25 of valve member 22 is made sufficiently great to close the inlet from the funnel member 14 to the measuring chamber, when the valve is in the position shown in FIGURE 3, by making contact with the inner surface of the lower portion of the funnel. Similarly, when the valve is in the position shown in FIGURE 4, the conical surface of valve member 23 closes the outlet of the chamber. It should be noted that the lengths of shaft 21 and chamber wall 15 are such that only one of the valve members 22 or 23 is operative at any one time to close one of the ends of the chamber 16. This is shown in FIGS. 3 and 4.

The chamber member 15 is surrounded by a shell 33 which has a projecting lip 34 on the inner wall thereof. The end 36 of the shell adjacent the funnel is crimped and limits the travel of the shell away from funnel 14 with respect to the member 15 by abutment with a projecting lip 35 on the outer wall of the chamber member 15. All of the lips 34 and 35 and the crimped end 36 may completely encircle the respective walls or may be segmented, as desired. A coil spring 38 is located between the member 15 and the shell 33 and is held between the two projecting lips 34 and 35. The spring 38 normally biases the shell 33 to a first position shown in FIGURE 3, i.e., away from the funnel with the shell travel limited by the abutting lip 35 and crimped end 36. In this case, the inlet to chamber 16 is closed by valve 22 and the chamber outlet is open.

The valve 20 is connected to the shell 33 for movement therewith by a plurality of spaced arms 27 having openings 28 therebetween. The lower valve member 23 and the arms 27 may be formed as one assembly and connected to the valve shaft 21 with the arms 27 resting on the lower edge of shell 27. In a preferred arrangement, the valve 20, arms 27 and shell 33 are molded from a resilient plastic material as a single integral unit.

As shown in FIGURES 3–5, the lower valve member 23 has an indentation 30 on its outer surface with inwardly sloping sides 31. The purpose of the indentation 30 is described below.

The operation of the dispenser 10 is as follows. First, the container 12 to which it is to be attached is opened completely or partially at one end. Next, the lip 18 of the funnel 14 is snapped over the ridge 19 of the container. The container and dispenser are left in the position shown in FIGURE 1 until they are to be used.

When the contents of the container 12 are to be metered out, both the container 12 and the dispenser 10 are turned upside down to the position shown in FIG. 3. As illustratively shown in FIG. 3, the contents of the container 12 are to be dispensed directly into the coffee holding cylinder 42 of a coffee percolator (not shown) which has the usual hollow stem 44 extending therein. In this case the top of stem 44 is placed into the indentation 30 to serve as the pressure point against which force is applied to move the valve. Before any force is applied to the top of container 12, the spring 38 normally urges the shell 33 downwardly, as shown in FIG. 3, to place the valve 20 in the first, or normal, position in which valve member 22 seals the inlet to chamber 16 and valve member 23 is spaced from the outlet to leave it open. To discharge the material from the container it is only necessary to exert a force on the top of container 12. In this case, force against the top of the container (or the bottom of the percolator) causes the stem 44 to press against the valve member 23 to move the shell 33 and the valve 20 upwardly to the second position shown in FIG. 4. In this second position of the valve, member 22 is spaced away from the inner surface of the funnel and a passage is provided into the discharge chamber 16 so that the material in container 12 flows freely into the chamber by the force of gravity. At the same time the lower valve member 23 moves upwardly and contacts the rim 24 of the discharge member 15 to seal off the chamber outlet. This traps a measured quantity of the container contents into the chamber, as determined by the volume of chamber 16. When pressure on the container or the percolator is removed, permitting the spring 38 to urge the shell 33 and valve 20 back to the first position shown in FIG. 3, the bottom of the discharge chamber 16 is opened and the material trapped in the chamber 16 is released directly into the coffee holder 42 of the percolator.

If the dispenser is to be used with a device which does not have a stem 44 or other similar structure to fit into the indentation 30 or move the valve upon application of force to the container, it is only necessary to move the shell 33 up and down to dispense the contents.

It should be understood that by repeated up and down movements of the container 12 or the shell 33 metered quantities of material from container 12 will be dispensed in accordance with the size of the chamber 16. For each travel cycle of the valve 20 produced by moving the shell or container and then removing the force, upper valve member 22 will first be opened to permit a quantity of material to flow into chamber 16 and the outlet of the chamber will be sealed off by member 23. When the force is released the spring 38 returns the valve to its normal position with the chamber inlet closed and the outlet open so that the material trapped in the chamber will be released and the chamber will be cleared waiting for the next movement of the valve and the receipt of additional material from the container.

It should be understood that the dispenser 10 may be made of any suitable material. For example, it may be made of metal in which case the bottom valve member 23 and arms would be integrally formed and would be screwed onto the valve shaft so that the arms 27 rest on the lower portion of the shell 33. Alternatively, and preferably, the entire dispenser device is made of a plastic material which is somewhat resilient, such as nylon, polyethylene, polypropylene, etc. In this case, the funnel and chamber are molded as one piece and the shell and valve as another. The two pieces are forced together in the proper positions during assembly.

In a preferred embodiment of the invention the lip 18 of the funnel is constructed to form a substantially airtight seal around the top of the container. Also, the valve member 22 is preferably made to substantially seal off the inlet to the chamber when the dispenser is not in use. This prevents air from entering into the container and reacting with the material therein to cause it to lose its freshness. However, manufacturing tolerances for the seal between the valve member 22 and the inlet to the funnel need only be sufficient to prevent the contents of the container from entering the chamber 16 when the valve is in its normal position; i.e., a space can be left which is slightly smaller than the particle size of the material.

During the use of the dispenser it has been found that the material to be dispensed may tend to stick to the various surfaces. Thus, the surfaces of the funnel 14 and the valve members 22 and 23 are made conical and preferably with a relatively steep angle, for example, around 45° or more. This reduces the tendency of the material to stick.

As one modification of the invention, to take care of any contents which may be stuck on the bottom of the funnel member, a stirrer or scraper may be attached to the outside of the upper valve member 22 to extend into the funnel and to make contact with the inner wall thereof when the valve is in the position of FIG. 3. When this is done, merely by turning the container 12, the scraper will be caused to rotate around the inner wall 14 of the funnel and remove the stuck material.

While a preferred embodiment of the invention has been described above, it will be understood that it is illustrative only, and the invention is limited solely by the appended claims.

What is claimed is:
1. A dispensing device adapted for dispensing material from a container of which at least a portion thereof is open comprising:
   a cover member having one end with an open portion adapted to fit over the open portion of the container and an exit passage at the other end,
   a dispensing member having a dispensing chamber therein with an inlet and an outlet, the inlet being in communication with the exit passage of the cover member,
   valve means having connected first and second valve members positionable at first and second locations, said first valve member being located within the confines of said cover member at all times,
   and means normally positioning said first and second valve members at said first location where said first valve member seals the inlet of said chamber and prevents the material from entering into the chamber through the inlet and the second valve member is spaced from the outlet of the chamber to permit material in the chamber to exit therefrom, movement of the valve members to the second location spacing the first valve member away from the inlet to open the inlet to permit material to enter the chamber and positioning the second valve member to seal the outlet to prevent material from leaving the chamber.

2. A dispensing device as set forth in claim 1 wherein the first valve member is located within the confines of the said cover member at all times and said second valve member has a portion lying outside of the dispensing chamber which is moved to seal the chamber outlet when the valve members are positioned at said second location.

3. A dispensing device as set forth in claim 1 wherein the inner walls of the cover member are tapered toward the exit passage of the cover member and the surface of the first valve member is tapered in the opposite direction.

4. A dispensing device adapted for dispensing material from a container of which at least a portion thereof is open comprising:
- a funnel member having one end for fitting over a part of the container surrounding the said open portion,
- a dispensing member located at the other end of said funnel member having a dispensing chamber with an inlet in communication with the interior of the funnel member and an outlet, said dispensing chamber holding a predetermined quantity of the material to be dispensed,
- a valve means having first and second valve members respectively located for interaction with the inlet and outlet of the chamber,
- means for moving said first and second valve members together to a first and then a second position, the first valve member sealing the inlet to the chamber and the second valve member opening the chamber outlet at said first position to dispense the material within the chamber, and the first valve member opening the inlet and the second valve member making direct contact with a portion of the chamber surrounding the outlet to seal the outlet at said second position to load the chamber with material from the container.

5. A dispensing device adapted for dispensing material from a container at which at least a portion thereof is open comprising:
- a funnel member having one end for fitting over a part of the container surrounding the said open portion,
- a dispensing member located at the other end of said funnel member having a dispensing chamber with an inlet in communication with the interior of the funnel member and an outlet, said dispensing chamber holding a predetermined quantity of the material to be dispensed,
- a valve means having first and second valve members respectively located for interaction with the inlet and outlet of the chamber, said second valve means having a portion thereof extending outside of said dispensing chamber,
- and resilient means normally positioning said valve means at a first position where said first valve member lies adjacent the chamber inlet and prevents material from entering the chamber and said second valve member is spaced from the chamber outlet to permit material in the chamber to be dispensed,
- and means for moving the valve means to a second position against the force of said resilient means causing the first valve member to be spaced from the inlet to permit the material to enter the chamber from the container and positioning the portion of the second valve member lying outside of the chamber into the outlet to seal the outlet and hold the material in the chamber.

6. A dispensing device adapted for dispensing material from a container of which at least a portion thereof is open comprising:
- a funnel member having one end for fitting over a part of the container surrounding the said open portion,
- a dispensing member located at the other end of said funnel member having a dispensing chamber with an inlet in communication with the interior of the funnel member and an outlet, said dispensing chamber holding a predetermined quantity of the material to be dispensed,
- a valve means having first and second valve members respectively located for interaction with the inlet and outlet of the chamber,
- a shell member surrounding at least a portion of said dispensing member and connected to said valve means for moving the same,
- and a spring located between said shell and dispensing members and engaging the members for normally biasing the valve means to a first position where said first valve member lies adjacent the chamber inlet and prevents material from entering the chamber and said second valve member is spaced away from the chamber outlet to permit the material on the chamber to be dispensed, moving of the shell against the force of the spring locating said valve means at a second position where the first valve member is spaced from the inlet and permits the material from the container to enter the chamber and the second valve member lies adjacent the outlet and holds the material in the chamber.

7. A dispensing device as set forth in claim 6 wherein said first valve member is of generally conical shape and is located within the confines of the funnel member with the apex of the cone pointed toward the container, and the second valve member is also of generally conical shape with the apex of the cone pointed toward the interior of the dispensing chamber.

8. A dispensing device as set forth in claim 7 wherein an indentation is provided on the exterior surface of the second valve member to accommodate the stem member of another device to facilitate movement of the valve means.

9. A dispensing device adapted for use on the open portion of a container for dispensing particulate solid material therefrom comprising:
- a funnel shaped member adapted to fit over the open portion of the container,
- a dispensing member having a dispensing chamber in communication with said funnel shaped member, said chamber having an inlet to the funnel and an outlet,
- a valve including a shaft having a generally conical first valve member at one end thereof extending above said inlet into said funnel with the apex pointed toward the container and a generally conical second valve member at the other end thereof whose apex is pointed toward the chamber and whose base lies outside of the chamber outlet,
- a shell member surrounding at least a portion of said dispensing member,
- a plurality of spaced arms connecting said second valve member to said shell to thereby move the valve as the shell moves relative to the rest of the dispenser,
- a spring located between the dispensing member and the shell and engaging the shell and said dispensing member, said spring normally biasing said valve to a first position with respect to the chamber where the base of said first valve member closes the inlet to the chamber and the second valve member is spaced from the chamber outlet to permit dispensing of the material in the chamber, force applied to the dispenser producing movement of said valve relative to said shell to a second position whereby the first valve member is spaced from the chamber inlet to permit the dropping of the material from the container into the chamber and said second valve member closes the chamber outlet, returning of said valve to said first position by the removal of the force permitting the material on the chamber to pass out of the chamber outlet through the space between the arms.

10. A dispensing device as set forth in claim 9 wherein an indentation is provided on the exterior surface of the second valve member to accommodate the stem member of another device to facilitate movement of the valve means.

11. A dispensing device adapted for dispensing material from a container of which at least a portion thereof is open comprising:
 a funnel member having one end for fitting over a part of the container surrounding the said open portion,
 a dispensing member located at the other end of said funnel member having a dispensing chamber with an inlet in communication with the interior of the funnel member and an outlet, said dispensing chamber holding a predetermined quantity of the material to be dispensed,
 a valve means having first and second valve members respectively located for interaction with the inlet and outlet of the chamber, a portion of said second valve member being located outside of said dispensing chamber,
 a shell member surrounding at least a portion of said dispensing member and connected to said valve means for moving the same,
 and a spring located between said shell and dispensing members and engaging the members for normally biasing the valve means to a first position where said first valve member lies adjacent the chamber inlet and prevents material from entering the chamber and said portion of said second valve member located outside of said dispensing chamber is spaced away from the chamber outlet to permit the material in the chamber to be dispensed, moving of the shell against the force of the spring locating said valve means at a second position where the first valve member is spaced from the inlet and permits the material from the container to enter the chamber and the portion of said second valve member located outside of the dispensing chamber being moved to seal the outlet and thereby hold the material in the chamber.

References Cited by the Examiner

UNITED STATES PATENTS

| | | | |
|---|---|---|---|
| 2,722,345 | 11/1955 | Van Buren | 222—453 X |
| 3,128,915 | 4/1964 | Matter | 222—449 X |
| 3,141,585 | 7/1964 | Emmert | 222—453 X |

M. HENSON WOOD, JR., *Primary Examiner.*

LOUIS J. DEMBO, ALLEN N. KNOWLES,
*Assistant Examiners.*